United States Patent [19]

Geleziunas

[11] Patent Number: 4,804,947
[45] Date of Patent: Feb. 14, 1989

[54] WATER SENSING APPARATUS

[76] Inventor: Rimas J. Geleziunas, 3900 Yonge Street, Toronto, Ontario, Canada, M4N 3N6

[21] Appl. No.: 55,273

[22] Filed: May 29, 1987

[51] Int. Cl.[4] .......................................... G08B 21/00
[52] U.S. Cl. .................................. 340/620; 340/693; 200/190
[58] Field of Search ............... 340/603, 604, 605, 618, 340/691, 693, 586, 546, 620; 73/304 R; 200/182, 185, 190

[56] References Cited

U.S. PATENT DOCUMENTS

| | | | |
|---|---|---|---|
| 3,824,460 | 7/1974 | Gustafson | 340/604 X |
| 4,297,686 | 10/1981 | Tom | 340/605 X |
| 4,319,232 | 3/1982 | Westphal et al. | 340/604 |

OTHER PUBLICATIONS

Solid State Scientific Information Sheet SCL5332, dated Mar. 5, 1984.

Primary Examiner—Joseph A. Orsino
Assistant Examiner—Jeffery A. Hofsass
Attorney, Agent, or Firm—Rogers, Bereskin & Parr

[57] ABSTRACT

A water sensing apparatus has a housing and a circuit within the housing. An alarm, e.g. a piezoelectric horn, is driven by the circuit. An elongate sensor is secured to the housing and is connected to the circuit. The other end of the sensor is adapted for sensing the presence of water, to activate the alarm. The sensor is both sufficiently rigid to enable it to maintain a configuration in which the apparatus is hung by the sensor, and is sufficiently flexible to enable it to be bent manually to a desired configuration.

24 Claims, 3 Drawing Sheets

WATER SENSING APPARATUS

FIELD OF THE INVENTION

This invention relates to a water detection apparatus. This invention more particularly relates to a water detection apparatus suitable for domestic or industrial use, for detecting floods and high water levels in baths or other containers.

BACKGROUND OF THE INVENTION

The problem of flooding in domestic housing and industrial buildings is well known. This is particularly the case in structures that have basements. Flooding can be caused by a variety of sources. For example, it can be caused by a burst pipe, heavy rainfall, or water backing up through the drains. In many cases, flooding is only discovered after a significant amount of water has collected, causing considerable damage.

It is desirable that any flooding should be detected as soon as possible. In many cases, the actual water accumulation is relatively slow, so that early detection enables remedial action to be taken. For example, in the case of a burst pipe, the main water supply can be turned off. Alternatively, if the water is coming from outside, then, in extreme cases, one could use a pump to pump out the basement.

Also, some houses and industrial buildings are located in areas that have a high water table. In such a case, it is relatively common to provide a sump pump or the like, to prevent excessive accumulation of water in a basement. This is an adequate solution, provided the pump works as required. However, if the pump fails, then a considerable quantity of water can accumulate before the failure is detected.

It is also to be realized that, apart from domestic and industrial usage, there are situations where it is desirable to monitor the filling of a vessel. Thus, for example, in the domestic situation, it is desirable to be able to monitor the filling of a bath tub, sink and the like.

Also, for external use, it is common to have a tub or container that is filled with water from one source or another. Again, it is often desirable to monitor the filling of the container.

For marine use, it is desirable to monitor the water level in the bilges of a vessel. This can provide an early warning of failure of a sump pump or a leak occurring.

Whilst proposals have been made for flood alarms or water level detectors, many earlier proposals suffered from many disadvantages. Such detectors were often intended either to be fixed in position, or were intended for being moved around from location to location. However, earlier detectors were not suitable for both types of use. Some earlier detectors did not include any lead with the actual sensor on it, thus effectively preventing their use for detecting bath tub levels etc. For use in monitoring bath tub levels and the like, a water sensing apparatus should be capable of being readily mounted on the edge of the bath tub. This was not possible with known devices.

BRIEF SUMMARY OF THE PRESENT INVENTION

In accordance with the present invention, there is provided a water sensing apparatus comprising a housing, a circuit within the housing, an alarm connected to and driven by the circuit, and an elongate sensor, one end of which is secured to the housing and is connected to the circuit and the other end of which is adapted for sensing the presence of water, to activate the alarm, which sensor is sufficiently rigid to enable it to maintain a configuration in which the apparatus is hung by the sensor and which is sufficiently flexible to enable it to be bent manually to a desired configuration. The other end of the sensor has two exposed contacts.

The sensor can be in the form of an elongate extruded plastic strip, with two solid copper conductors molded into it along its edges. The ends of the copper conductors are exposed at the other end of the sensor, for contacting water. The copper conductors provide the desired degree of stiffness and resiliency. The copper conductors can be of approximately 1/16" diameter and spaced approximately ½" apart.

For a water sensing alarm, it is also desirable that the user can be confident that the unit or apparatus is operative. To this end, the apparatus can further include an indication that it is operative. It is also preferably powered by a battery, and in this case can include an indication that the battery power is getting too low.

This can be achieved by providing a light emitting diode (LED), connected to and controlled by the circuit. The LED can be flashed briefly at set intervals, for example every 45 seconds, to indicate that the unit is operative. This uses little power. Additionally, when the power level gets too low, then the alarm can be sounded intermittently, to warn the user that the battery needs replacement. By this means, the user can be confident that the apparatus is operative.

BRIEF DESCRIPTION OF THE DRAWINGS

For a better understanding of the present invention, and to show more clearly how it may be carried into effect, reference will now be made, by way of example, to the accompanying drawings, in which.

DESCRIPTION OF THE PREFERRED EMBODIMENT

Figure 1:
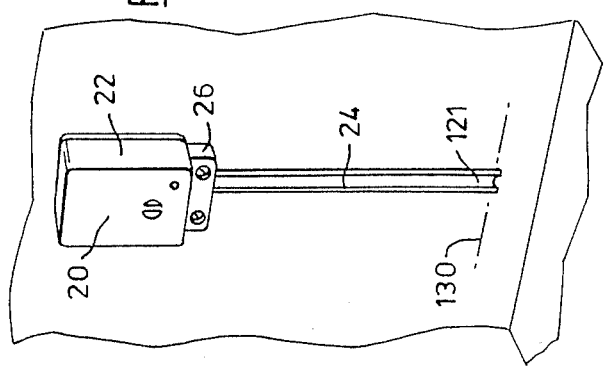
FIG. 1. is a perspective view of the water sensing apparatus according to the present invention mounted on a wall.

A water sensing apparatus is indicated by the reference 20. The apparatus 20 has a housing 22 and an elongate sensor 24. As shown in FIG. 1, it is provided with a mounting bracket 26.

Figure 4:
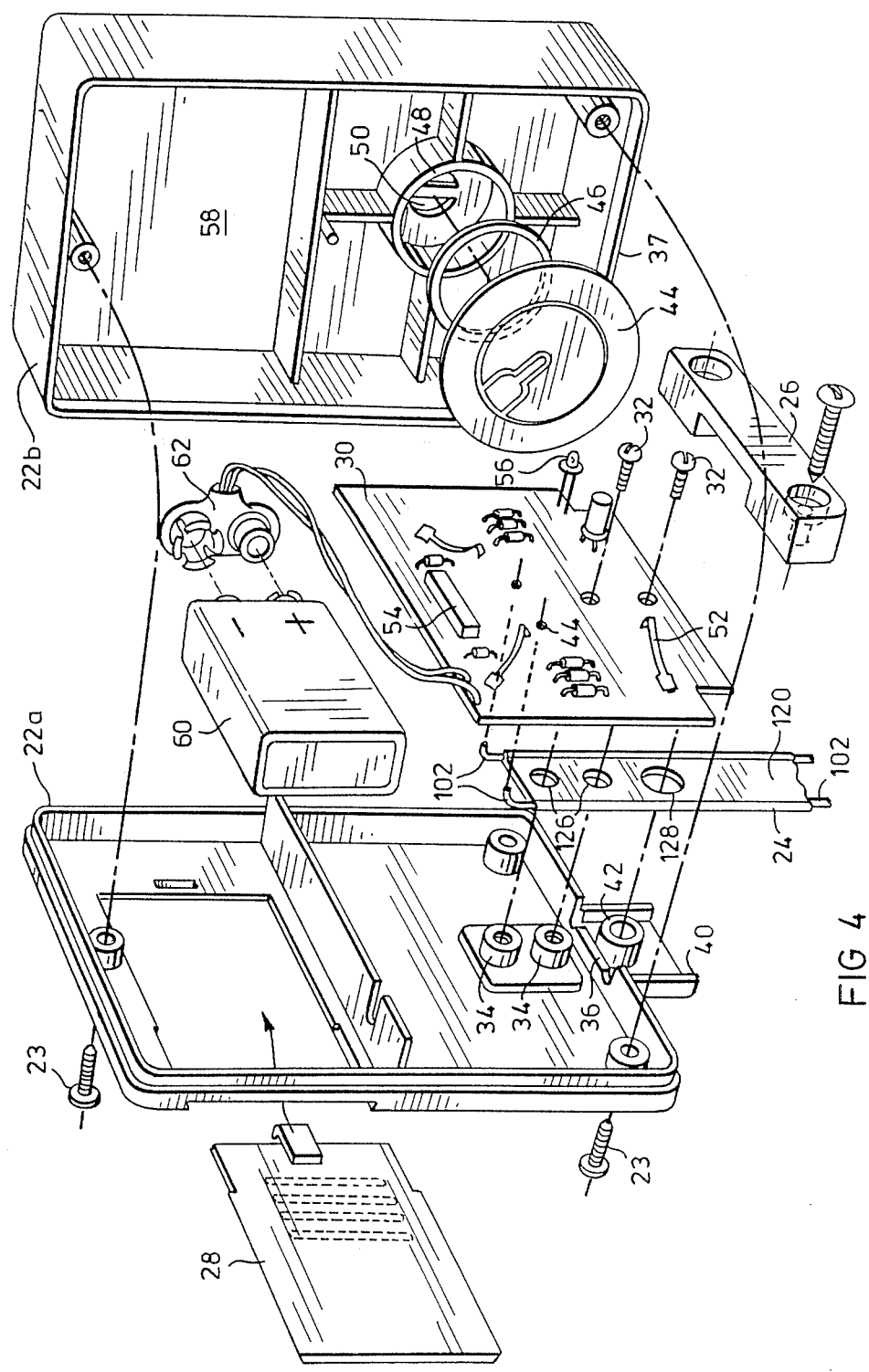
FIG. 4 is a perspective, exploded view, on a larger scale, of the water sensing apparatus of FIGS. 1 and 2.

Referring to FIG. 4, the housing 22, in known manner, comprises a rear housing half 22a, and a front housing half 22b, secured together by screws 23. The rear housing half 22a includes an opening closeable by a cover plate 28, in known manner.

Within the housing 22, a printed circuit board 30 is mounted. The circuit board 30 is secured by screws 32 to the rear housing half 22a. These screws 32 engage cylindrical projections 34.

The rear housing half 22a includes a profiled recess 36 for one, upper end of the sensor 24, indicated at 120.

A similar recess 37 is provided in the other housing half 22b. The housing half 22a additionally includes a downwardly extending extension 40 including a hollow cylindrical protrusion 42.

As described in greater detail below, the sensor 24 includes a body 122 including conductive leads 124. As shown, upper ends 124a of the leads are stripped and curved through 90° for mounting in holes 44 in the printed circuit board 30.

Additionally, the sensor upper end 120 includes a pair of holes 126, and below them an opening 128, the opening 128 being larger than each of the holes 126.

During assembly, the sensor upper end 120 is fitted onto the projections 34 and protrusion 42, which extend through the holes 126 and opening 128 respectively. The circuit board 30 is then secured by the screws 32 to the projections 34, thereby clamping the sensor upper end 120 in position.

The hollow cylindrical protrusion 42 extends below the main part of the housing 22, and can be used for permanent mounting of the device. Thus, a screw can be inserted through it to permanently fix the apparatus 20 to a wall.

To the front housing half 22b, a piezoelectric horn 44 is mounted. This piezoelectric horn 44 is mounted by means of an annular ring 46 of foam material, coated on both sides with adhesive. It is secured to a corresponding annular projection 48. This greatly facilitates mounting of the horn 44 as compared to conventional techniques. The piezo horn 44 can be of known construction and includes contact surfaces on its back. The housing 22 includes an opening 50 for the sound generated by the horn 44.

On the printed circuit board 30, flexible contacts, indicated generally at 52 are provided, for contacting the piezo horn 44, in known manner.

Also mounted on the printed circuit board 30 are an integrated circuit 54, which forms the basis of the circuit, and a light emitting diode (LED) 56. The other components on the circuit board 30 are detailed in relation to the diagram of FIG. 5.

In known manner, the top of the housing 22 defines a battery compartment 58, in which a battery 60 is located. The cover plate 28 provides access to the battery 60. The battery 60 is connected by a lead 62 to the printed circuit board 30. The battery 60 is a nine volt battery.

Figure 3:
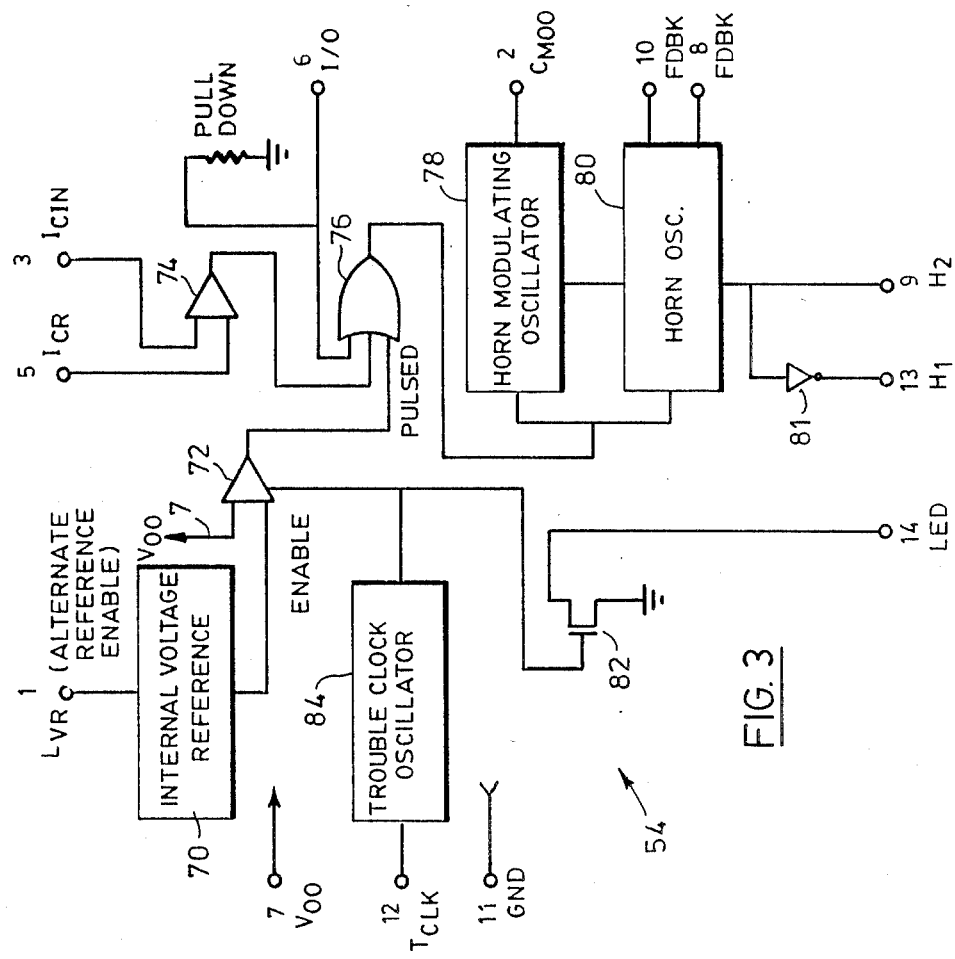
FIG. 3 is a schematic diagram of an integrated circuit forming part of the circuit of the water sensing apparatus.

Referring to FIG. 3, there is shown the internal circuit, in schematic form, of the integrated circuit 54. The fourteen pins of the integrated circuit 54 are given the reference numerals 1-14. The integrated circuit 54 can be any suitable circuit and can have varying characteristics. It is a low power CMOS integrated circuit. It has built-in hysteresis and a reduced input differential voltage, to make it stable yet sensitive.

The circuit includes an input 1 for a low voltage reference signal. This is connected to an internal voltage reference 70, which in turn is connected to a differential amplifier 72. The other input of the amplifier 72 is connected to an input 7 for the power supply voltage.

Input lead 3 is for an input from the sensor 24, whilst input lead 5 is for a sensor reference input. These inputs 3, 5 are connected to a further differential amplifier 74. The outputs of the two differential amplifiers 72, 74 are connected to two inputs of an OR gate 76. The input 4 is blank.

The input lead 6 is connected to another input of the OR gate 76, and also to ground as indicated.

Input lead 2 is connected to a horn modulating oscillator 78, which is in turn connected to a horn oscillator 80. An output of the OR gate 76 is connected to and controls the horn modulating oscillator 78 and the horn oscillator 80.

Input lead 9 serves as an output for the piezoelectric horn 44 and is connected to the output of the horn oscillator 80; the output of the oscillator 80 is also connected by an inverter 81 to another horn driver output at lead 13.

Lead 10 is a feedback lead from the horn 44, whilst lead 8 is an inverse feedback lead from the horn 44.

Lead 14 is connected to the LED 56, and is connected via a gate transistor 82 to ground.

Lead 11 is a ground connection.

Lead 12 is connected to a trouble clock oscillator 84, whose output is connected to the differential amplifier 72 and the gate transistor 82.

Figure 5:
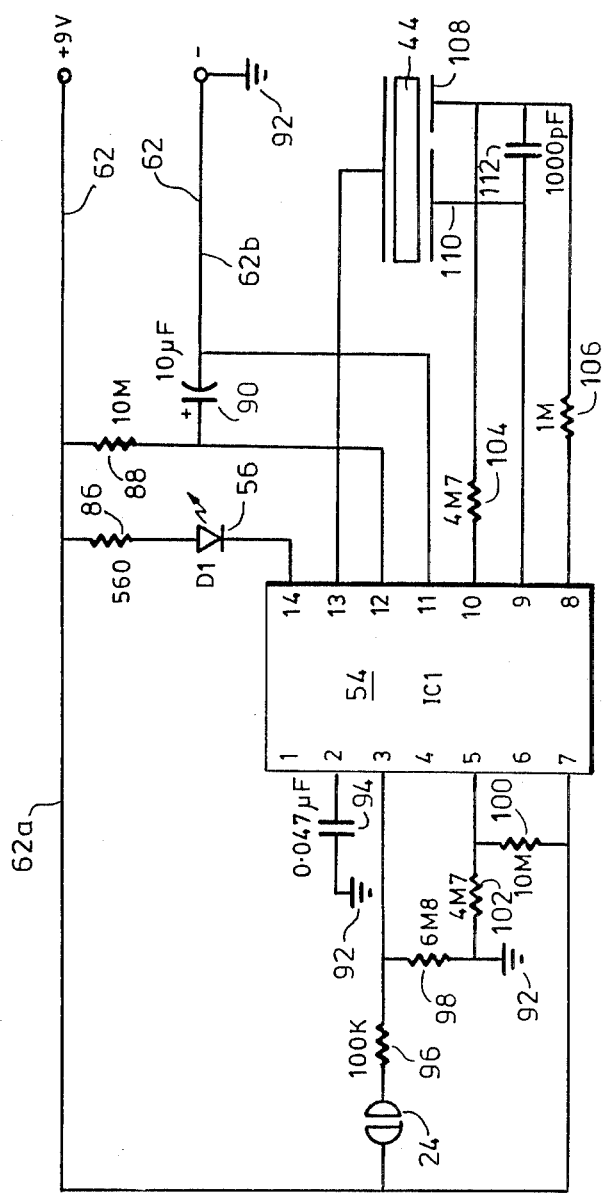
FIG. 5 is a schematic circuit diagram of the circuit of the water sensing apparatus of FIGS. 1 and 2.

Referring to FIG. 5, the integrated circuit 54 and its leads 1-14 are shown.

Of the battery leads 62, the positive lead 62a is connected via a resistor 86 and the LED 56 to the lead 14, with the lead 62b connected to ground. This positive lead is also connected via a resistor 88 to the lead 12 setting the trouble clock 84 frequency. The input lead 12 is also connected via a capacitor 90 to ground indicated at 92. The ground lead 11 is also connected to ground 92.

The first lead 1, for a low voltage reference is left opened, so that the internal voltage reference 70 is used.

The input lead 2 is connected via a capacitor 94 to ground. By providing a capacitor, this gives a pulsed output for the piezoelectric horn 44, as opposed to continuous.

For the sensor 24, one lead is connected to the positive battery lead 62a, whilst the other sensor lead is connected to a resistor 96, which in turn is connected to the sensor input 3. The sensor input 3 is also connected via a resistor 98 to ground. The values of the components are marked on FIG. 5, and as indicated, the resistor 96 has a much lesser value than the resistor 98.

The positive battery lead 62a is also connected by two resistors 100, 102 in series to ground 92. The sensor reference input 5 is connected to the junction between the two resistors 100, 102. This thus provides a reference voltage at the sensor input 5, of approximately one third the battery potential.

The lead 4, which is blank in any case, is left open, as is the lead 6 for connection to other units. In a situation, for example industrial usage, where many such units are provided, they could be connected together via the leads 6. The power supply lead 7 is connected to the battery lead 62a.

The piezoelectric horn 44 is connected to the horn driver output 13. The feedback lead 10 and the inverse feedback lead 8 are also connected via resistors 104 and 106 to one input 108 of the horn 44. Another input 110 of the horn 44 is connected to the other horn driver lead 9, with a capacitor 112 provided between the horn inputs 108, 110.

The mode of operation of the water sensing apparatus 20 will now be described. In use, a suitable battery is connected to the lead 62.

The trouble clock oscillator 84 controls the amplifier 72 and gate transistor 82, so as to maintain them normally open. At set intervals, for example 45 seconds, it closes them briefly. This has the effect of turning the LED 56 on briefly, to provide a visual indication that the unit is operative. Simultaneously, as the amplifier 72 is activated, it conducts a voltage check. It compares the voltage at the lead 7 with the internal reference voltage from the unit 70. If the voltage at the lead 7 is too low, then a signal is sent to the OR gate 76, which in turn activates the horn modulating oscillator 78 and the horn oscillator 80. Thus, if the battery level falls too low, at the interval set by the trouble clock oscillator 84, the horn 44 is switched on briefly. This provides a warning to the user that the battery 60 should be replaced. This intermittent "beeping" at 45 second intervals can continue for 30 days. If battery is not replaced, then the horn 44 will sound continuously for a shorter time.

Simultaneously, the sensor input at lead 3 is continuously compared with the reference input at the lead 5. If the sensor leads 20 contact a body of water, then an electrical connection is made between them. This raises the voltage at the sensor input 3. This differential between the voltage at the input 3 and the reference at the input 5 is detected by the amplifier 74. It sends a signal through the OR gate 76 turning the horn modulating oscillator 78 and the horn oscillator 80 on. The horn 44 is then powered through leads 8, 9, 10 and 13, to provide a pulsed sound, warning the user that water has been sensed.

The sensor 20 is elongate and has a body 122 formed of extruded plastic material. As shown in FIG. 4, the cross section of the body 122 has a central planar portion of uniform thickness, and two edge portions, which are generally circular and whose diameter is larger than the thickness of the central portions. Located within the circular edge parts are the sensor leads 124. Each lead 124 is formed from solid copper and has a diameter of approximately 1/16". The leads 124 are spaced by approximately ½". This construction of the sensor 124 enables it to be readily flexed or bent by hand to any desired configuration. At the same time, the solid leads 124 enable it to maintain the shape that it is bent into. The lower ends of the leads 124 are exposed to form contacts for water.

Figure 2:
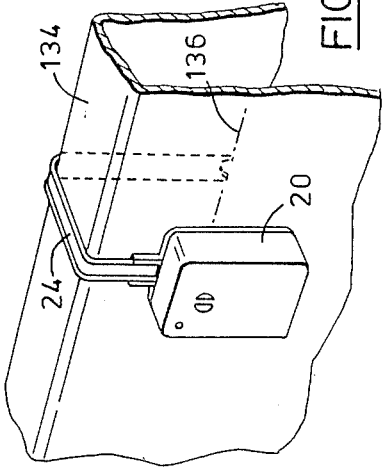
FIG. 2 is a perspective view of the water sensing apparatus of FIG. 1, mounted on the lip of a bath tub.

With reference to FIGS. 1 and 2, a description of the mode of use of the water sensing apparatus 20 will now be given.

As shown in FIG. 1, the apparatus 20 can be mounted by means of the bracket 26. For this purpose, the bracket 26 has mounting holes 27 for screws. The sensor 24 is manipulated to a straight configuration, and the apparatus 20 is placed in the bracket with the extension 40 of the housing held by the bracket 26.

As shown, a sensor lower end 121 is then located at a level 130 above a floor 132. For example, the sensor 24 could be located in the basement of a house, in which case, the level 130 would be just above the basement floor at 132. Whilst the lower end 121 is shown spaced just above the floor, it could actually be touching the floor, so as to give an indication of the presence of any water.

If flooding should occur, causing water to accumulate on the floor 132, when the depth of water reaches the level 130, this will close the two leads 124 of the sensor 24. Accordingly, the apparatus 20 will be activated, and the alarm 44 sounded.

FIG. 2 shows an alternative use of the device. Here, the sensor 24 has been manipulated into a generally inverted U-shape. This enables the apparatus 20 to be hung on the side of a bath tub, indicated at 134. The sensor lower end 121 is then at a level 136 within the bath tub. The bath tub can then be left to fill, without the user being worried about it overflowing. Once the water reaches the level 136, the sensor leads 124 will again be connected, triggering the alarm 44. The user can then return to turn off the water.

This latter function is expected to be particularly useful for jaccuzzis, hot tubs and the like, whether indoors or outdoors, as they take a long time to fill. Consequently, most people do not like to wait while they are filling. However, if left unattended, there is the danger that one can forget that they are filling, resulting in flooding etc. It will thus be realized that the water sensing apparatus of the present invention can be used for a variety of applications, indicating the presence of water from various sources.

For domestic use, it can be used in the basement, to indicate storm sewer backup, leakage from pipes or through outside walls, or failure of sump pumps. It can also indicate overflow of a laundry tub etc. In the kitchen, it can again detect leakage of pipes or an overflow, for example, from a sink. It can also detect leakage from a dishwasher or trouble with an automatic ice making machine.

In a laundry room, it can be used to detect broken or leaking hoses, or overflow or a leaky washing machine. In a bathroom, it can detect overflow from a bath tub. This both saves the damage caused by water overflow, as well as saving on hot water, by simply ensuring that the bath is not overfilled. It can also detect overflow or leakage from a toilet, or again broken or leaking piping.

It is also to be noted that in an apartment, if flooding occurs, the loud piezoelectric alarm can alert neighbors and security patrols passing outside the apartment. This can be particularly useful when the occupant is on vacation etc.

In an industrial or farm situation, it can be used to detect overflow of a variety of vessels. It can also detect accumulation of condensation, or again the failure of sump pumps.

For marine applications, it can be used to detect accumulation of water in the bilges of a boat.

The apparatus requires little or no maintenance. The provision of an automatic battery warning means that no regular, independent check of the battery condition should be needed. However, it is recommended that the apparatus is tested once a month, eg. by immersing the sensor in water. Also, the end of the sensor should be maintained free from lint and dirt, for example by cleaning with a stiff brush. It should also be ensured that it is always mounted as required. Water should not be allowed to drip over the housing 22, nor should the housing 22 be immersed in water.

I claim:

1. A portable, resistive, water sensing apparatus comprising a housing, a circuit for detecting changes in resistance within the housing, an alarm connected to and driven by the circuit, and an elongate sensor, one end of which is secured to the housing and is connected to the circuit, and the other end of which has two exposed contacts, so that the circuit can detect changes in resistance between the exposed contacts to detect the presence of water, which sensor has a rigidity which is sufficient to enable it to maintain a configuration in which it supports the whole weight of the sensor to enable the apparatus to be hung by the sensor and has a flexibility which is sufficient to enable it to be bent manually to a desired configuration.

2. An apparatus as claimed in claim 1, in which the sensor comprises an elongate body and a pair of leads extending along the length of the body, with one end of the leads connected to the circuit and with the other end of the leads at the other end of the sensor exposed, so that water can form a connection between those other ends.

3. An apparatus as claimed in claim 2, in which the leads are uniformly spaced apart along their length.

4. An apparatus as claimed in claim 3, in which the elongate body is formed from a plastic material and is of generally uniform cross-section along the length thereof, with the leads embedded in the body.

5. An apparatus as claimed in claim 4, wherein the elongate body of the sensor comprises a central, planar portion of generally uniform thickness and, extending along either edge thereof, an edge portion of generally circular cross-section, the diameters of the edge portions being similar and being larger than the thickness of the central portion.

6. An apparatus as claimed in claim 4, in which the one end of the sensor includes a pair of spaced holes, and wherein the housing includes a pair of projections, on which the sensor is mounted.

7. An apparatus as claimed in claim 6, wherein the circuit is provided on a printed circuit board, which is secured to the cylindrical projections, with the one end of the sensor located between the printed circuit board and the housing.

8. An apparatus as claimed in claim 2, in combination with a bracket, which bracket can be permanently fixed to a verticl surface, and which enables the apparatus to be removably mounted on the bracket.

9. An apparatus as claimed in claim 6, in combination with a bracket which has a U-shaped profile and which is adapted for being permanently secured to a vertical surface to form a socket, and wherein the housing of the apparatus includes an extension extending downwardly therefrom adjacent the sensor, whereby the extension can be located in that socket with the housing above the bracket and the sensor extending below the bracket.

10. An apparatus as claimed in claim 9, wherein the extension includes a hollow cylindrical protrusion, and the body of the sensor includes an opening through which the hollow cylindrical protrusion extends.

11. An apparatus as claimed in claim 2, 7, 9 or 10, wherein the alarm comprises a piezoelectric horn which is mounted to the housing by means of an annular ring of a foam material, which ring includes adhesive layers on both sides thereof.

12. An apparatus as claimed 2, wherein the alarm comprises a piezoelectric horn, and wherein the circuit comprises a DC power supply having one power supply line and another line connected to ground; a horn oscillator connected to the piezoelectric horn and the power supply; a differential amplifier having a sensor lead input connected to one lead of the sensor and a sensor reference input and an output connected to the horn oscillator for controlling the horn oscillator, the other lad of the sensor being connected to the power supply line.

13. An apparatus as claimed in claim 12, wherein a pair of resistors are connected in series between the power supply lines to provide a reference voltage at a junction therebetween, and that junction is connected to the sensor reference input.

14. An apparatus as claimed in claim 13, which includes another differential amplifier having one input connected to an internal voltage reference and another input connected to the power supply line, and wherein an OR gate has inputs connected to outputs of the differential amplifiers and an output connected to the horn oscillator.

15. An apparatus as claimed in claim 14, wherein the other differential amplifier includes an enabling input, and a trouble clock oscillator is provided connected to the enabling input, the trouble clock oscillator enabling the other differential amplifier at predetermined intervals.

16. An apparatus as claimed in claim 15, wherein the trouble clock oscillator is connected to and controls a visual indication device.

17. An apparatus as claimed in claim 16, wherein the trouble clock oscillator is connected to and controls a gate transistor, and wherein the gate transistor is connected in series with an LED between the power supply lines.

18. An apparatus as claimed in claims 14, 15 or 17, which includes a horn modulating oscillator connected to the horn oscillator, with the horn modulating oscillator and the horn oscillator both connected to and controlled by the output of the OR gate.

19. An apparatus as claimed in claim 17, in combination with a mounting bracket adapted for permanent mounting to a vertical surface, the apparatus being removably mountable on the mounting bracket.

20. An apparatus as claimed in claim 19, which includes an annular ring of foam material having adhesive layers on both sides thereof, which annular ring mounts the piezoelectric horn to the housing.

21. A portable, resistive, water sensing apparatus comprising a housing, a circuit within the housing for detecting changes in resistance, an alarm connected to and driven by the circuit, and an elongate sensor, which is of uniform cross-section and which comprises an elongate body formed from an insulating material and having a central portion and two edge portions maintained at a uniform spacing along the length thereof by the central portion, each of the portions extending along substantially all the length of the sensor, and two conductive sensor leads encased in the edge portions, with one ends of the sensor leads connected to the circuit within the housing and the other ends of the sensor leads exposed to water, so that the circuit can detect changes in resistance between said exposed other ends to detect the presence of water, the sensor leads being otherwise covered by said side edge portions, wherein the sensor has a rigidity which is sufficient to enable it to maintain a configuration in which it supports the whole weight of the sensor to enable the apparatus to be hung by the sensor and has a flexibility which is sufficient to enable it to be bent manually to a desired configuration.

22. A water sensor as claimed in claim 21, wherein the elongate body of the sensor is formed from a plastic material.

23. A water sensing apparatus as claimed in claim 21 or 22, wherein each of the edge portions is of generally circular section, the edge portions have the same diameter and the central portion has a uniform thickness that is less than the diameter of the edge portions.

24. An apparatus as claimed in claim 13, wherein said one sensor lead is connected by a pair of resistors in series to ground and said sensor lead input is connected between that pair of resistors.

* * * * *